Nov. 18, 1947.  E. C. PALMER  2,431,074
DOUGH WORKING PROCESS
Original Filed May 3, 1943
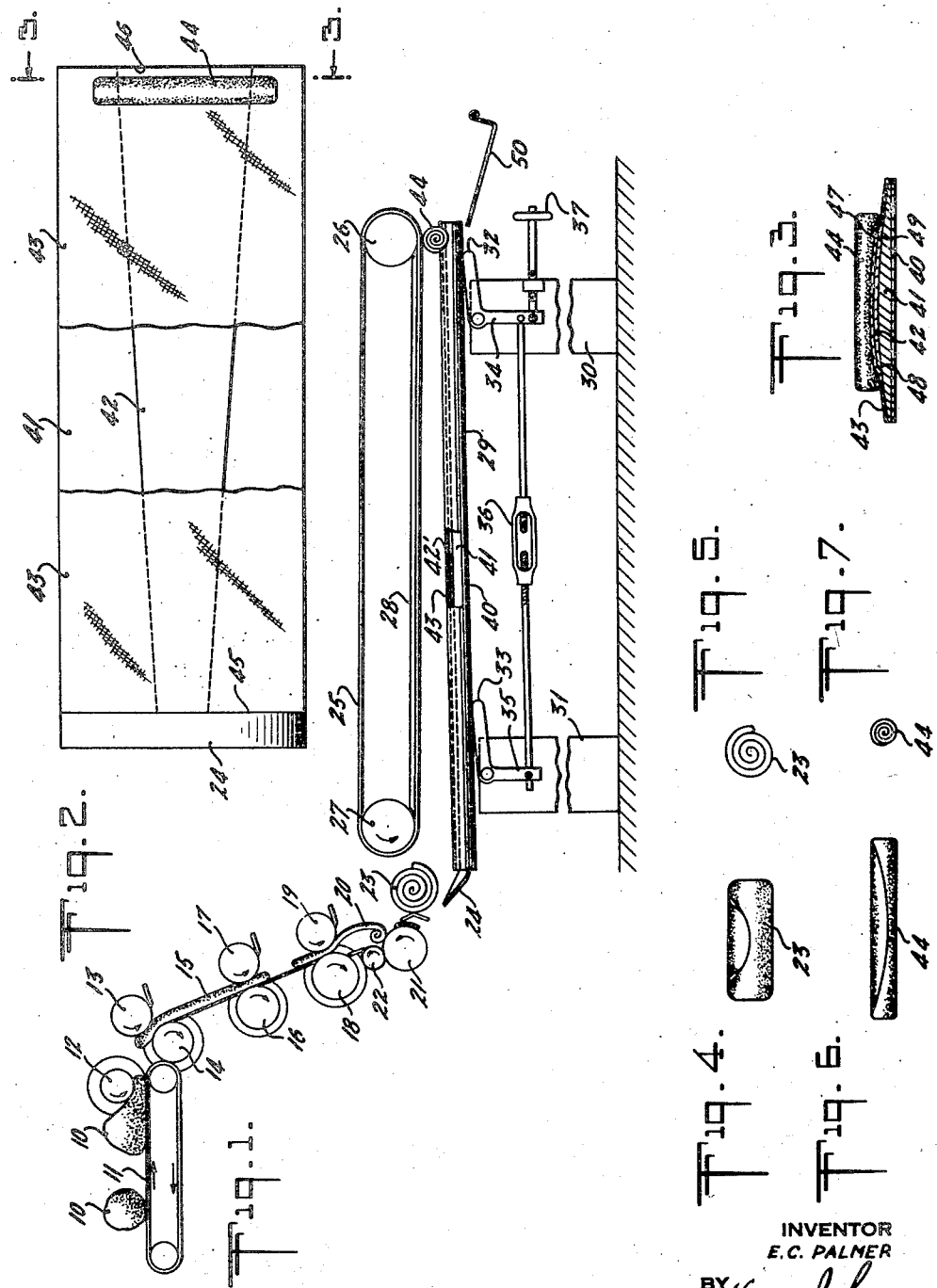
INVENTOR
E.C. PALMER
BY Henry Savage
ATTORNEY Patented Nov. 18, 1947

2,431,074

UNITED STATES PATENT OFFICE 2,431,074

DOUGH WORKING PROCESS

Earl C. Palmer, Avenel, N. J., assignor to National Biscuit Company, New York, N. Y., a corporation of New Jersey Original application May 3, 1943, Serial No. 485,535. Divided and this application March 25, 1947, Serial No. 737,013

3 Claims. (Cl. 107—54)

1

My invention as limited to the claims in this application relates to dough working process and has for its principal object to produce a loaf of bread by an improved and simplified process at decreased cost of production, yet producing bread of the highest quality and finest texture. The invention in its entirety includes apparatus for carrying out the process that is claimed in my co-pending application Ser. No. 485,535, filed May 3, 1943, of which the present application is a division.

Prior to my invention, it has been the general practice in modern bread bakeries to pass the dough through a divider where it is divided into pieces or lumps, each sufficient to form one loaf of bread. These pieces are delivered successively into a rounder where each piece is rolled into a substantially spherical ball. These balls pass through a proofer and then to a molder. In the molder, each ball is first rolled into a sheet between successive pairs of rollers and then curled or coiled into a substantially cylindrical loaf. Each cylindrical curled loaf is then passed between a rotating drum and compression plate where the convolutions are compressed and molded together so as to form a substantially homogeneous mass of elongated cylindrical shape. This dough loaf is then passed through an extender or elongater where it is rolled between a moving belt and fixed bed into a longer narrower cylindrical loaf of dough. Two or more of these strips are then twisted together, usually by hand, to form the final dough loaf ready to go into a pan for baking. Heretofore this final step of twisting has been necessary in order to produce a loaf of fine texture, that is, a baked loaf free from large pockets or cells.

By means of my invention, I produce a loaf of fine texture, substantially free from objectionably large cells or bubbles, from a single piece of dough without twisting. This I do by using less and more simple apparatus than heretofore used and also by omitting the step of twisting, which requires expert hand labor, thereby considerably reducing the cost of the finished loaf.

According to my invention, I proceed in the usual manner as described above but omit the drum and its compression plate, and move the elongater up to take its place so that the loaf is delivered directly from the curler to the elongater. I have then modified the elongater so that the curled dough loaf as it passes through is squeezed first at the center and, as it progresses, the dough at the center is progressively rolled or kneaded out toward the ends as the loaf is elongated. This

2 progressive kneading out of the dough from the center toward the ends elongates the piece without breaking down the cell structure, and since the ends are not confined, as they are by the flanges of the usual moulder drum, any air trapped between the convolutions during curling is free to escape.

In the accompanying drawings, I have illustrated one form of apparatus suitable for carrying out the present invention.

Fig. 1 is a side elevation, partly in section, of one embodiment of my invention.

Fig. 2 is a top plan of my improved compression plate or bed of the elongater unit.

Fig. 3 is a section taken substantially on line 3—3 of Fig. 2 showing a dough loaf as it is about to leave the elongater.

Figs. 4 and 5 are side and end elevations, respectively, of the dough loaf as it leaves the curler.

Figs. 6 and 7 are side and end elevations, respectively, of the loaf as it leaves the elongater, ready for the baking pan.

A ball of dough 10 sufficient to form one loaf is delivered from the proofer to the belt 11 which carries it under the roller 12 where it is flattened and somewhat elongated. It then passes between the pre-sheeter rolls 13, 14 where it is further flattened and elongated as shown at 15. It then passes between the rolls 16, 17 and 18, 19 which roll it into a thin sheet 20 of uniform width, except for rounded ends. The end of this sheet is caught by the curling rollers 21, 22 which coil it into a generally cylindrical loaf 23. Side and end views of this loaf are shown in Figs. 4 and 5.

The apparatus as thus far described is a usual commercial machine and per se is not part of my invention.

Prior to my invention, the roll of dough 23 has been delivered from the curling rollers to the drum of the moulder. But I omit this moulder drum and deliver the dough directly to the receiving end 24 of the elongater.

This elongater is of usual construction except that I have modified the form and function of the bed so that this single unit by a single operation performs the functions and produces the results heretofore attained by the conjoint action of the moulder drum, elongater and twisting.

The elongater has a drive apron 25 passing around driving rollers 26, 27 with the lower run of the apron supported against upward movement by a plate 28. The two runs of the apron are substantially horizontal and the width is greater than the length of the finished dough loaf.

Beneath the lower run of the apron is the pressure board or table 29, which is fixed during operation but is adjustable so as to vary both its inclination and distance from the apron. The table is supported on standards 30, 31 and is adjusted through the cams 32, 33 levers 34, 35, turnbuckle 36, and hand wheel 37. This is a usual construction in commercial elongaters.

In elongaters as heretofore used, the top of the pressure board or table 29 usually is slightly convex and it rolls out or elongates the dough only very slightly, a large part of the elongation having been accomplished by the moulder drum.

I have improved the action, in fact produced a new action or function, of the elongater by giving a new contour or shape to the top of the table 29.

Fig. 3 is a cross-section of my improved table in which 40 is the bottom plate, usually of steel, on which is secured a convex working surface or pad built up from several plys of canvas 41, but other suitable materials, as wood or plastic, may be used. This working surface is of uniform width throughout the length of table. Centrally on top of this surface 41, I secure a tapered dough working element or kneader 42, which is narrowest at the entrant end of the elongater and widest at the delivery end, as shown in Fig. 2. This kneader may be built up from canvas or any other suitable material, but I have found canvas to give very satisfactory results. In order to prevent the dough from filling in and adhering to the edges of this element, I prefer to cover it with a piece of light canvas 43 which will present rounded surfaces 48, 49 so as to work or knead the dough outward gently from the center toward the ends, as shown in Fig. 3.

The coiled roll of dough 23 when it leaves the curling rolls is approximately 7 inches long and 2½ inches in diameter for a 1 lb. loaf. The space between apron 25 and table 29 at the entrant end is approximately the diameter of this roll of dough. At the exit end, where the loaf drops onto the shelf 50, the space is approximately 2". The length of the finished dough loaf 44, Fig. 6, is approximately 12".

The raised portion, or kneader, 42 is located centrally on the table. I have found a width of 3 inches at its entrant end 45, a width of 9 inches at its exit end 46, an overall length of 4 feet and a thickness of ¼ inch, to give satisfactory results for a 1 lb. loaf. However, these dimensions are given only by way of illustration and will be changed for different working conditions, kinds of dough, and other variables.

The coiled loaf 23 is delivered to the elongater with the narrow end 45 disposed midway of its length. As the apron 25 grips the dough and starts rolling it along the table 29, the kneader 42 will press into the lower face of the dough and squeeze it out toward the ends. As the loaf progresses, the working element by reason of its increasing width keeps rolling and kneading the dough outward toward the ends in ever increasing quantities. This kneading and rolling outward elongates and spirally twists the dough in such manner that large gas pockets are avoided during baking. 47 indicates the action of working the dough outward by the kneader 42. When the dough loaf 44 drops to the shelf 50 it assumes a substantially cylindrical shape due to its resiliency, as shown in Fig. 7. It is then ready to be placed in the baking pan.

It will thus be seen that by means of my invention, I can entirely dispense with the usual moulding drum and the twisting of the loaf, yet obtain all the advantages that have been derived from their use heretofore. By dispensing with the drum and twisting, a considerable saving is made both in initial investment in equipment and cost of the finished loaf. The dough after it leaves the curler is prepared ready for panning in one continuous operation of kneading and rolling by a single simple piece of apparatus.

When the dough loaf is being rolled out between the apron 25 and pressure board 29, the apron keeps pressure applied on top of the loaf throughout its length while the kneader 42 exerts a greater pressure midway of the length of the loaf on its under side, which greater pressure is spread gradually outward to the ends as the loaf progresses along the pressure board.

Having thus described my invention and illustrated one means for carrying it out, what I claim is:

1. A process for preparing a loosely curled dough loaf for baking which comprises kneading and rolling the loosely curled loaf into longer cylindrical form by rolling and kneading the dough gradually, continuously and progressively outward from the center to the ends in a continuous operation.

2. A process for preparing a loosely curled dough loaf for baking which comprises compacting and elongating the curled loaf in a single continuous step by rolling and kneading the dough gradually, continuously and progressively outward from the center to the ends.

3. A process for preparing a loosely curled dough loaf for baking which comprises compacting and elongating the curled loaf in a single continuous step by rolling and kneading the dough gradually, continuously and progressively outward from the center to the ends by continuous pressure throughout the length of dough loaf and a greater continuous pressure applied first near the mid-point of the loaf and spread gradually, continuously and progressively outward from the mid-point to the ends.

EARL C. PALMER.